US012800069B2

(12) United States Patent
Nakamura et al.

(10) Patent No.: US 12,800,069 B2
(45) Date of Patent: Nov. 17, 2026

(54) EXTRUDED, MULTI-HOLE-PIPE AND MANUFACTURING METHOD THEREOF

(71) Applicant: UACJ Corporation, Tokyo (JP)

(72) Inventors: Shinichi Nakamura, Aichi (JP); Taichi Suzuki, Aichi (JP); Ryo Tomori, Aichi (JP)

(73) Assignee: UACJ Corporation, Tokyo (JP)

( * ) Notice: Subject to any disclaimer, the term of this patent is extended or adjusted under 35 U.S.C. 154(b) by 391 days.

(21) Appl. No.: 18/693,197

(22) PCT Filed: Oct. 13, 2022

(86) PCT No.: PCT/JP2022/038246
§ 371 (c)(1),
(2) Date: Mar. 19, 2024

(87) PCT Pub. No.: WO2023/068167
PCT Pub. Date: Apr. 27, 2023

(65) Prior Publication Data

US 2024/0384817 A1 Nov. 21, 2024

(30) Foreign Application Priority Data

Oct. 20, 2021 (JP) ................................ 2021-171857

(51) Int. Cl.
*F16L 9/19* (2006.01)
*B21C 23/00* (2006.01)
(Continued)

(52) U.S. Cl.
CPC .............. *F16L 9/19* (2013.01); *B21C 23/002* (2013.01); *B21C 37/151* (2013.01); *C22C 21/02* (2013.01); *C22F 1/05* (2013.01)

(58) Field of Classification Search
CPC ........... F16L 9/02; F16L 9/19; B21C 23/002; B21C 29/00; B21C 29/003; B21C 37/06;
(Continued)

(56) References Cited

U.S. PATENT DOCUMENTS 9,857,128 B2 1/2018 Furumura et al.
10,386,134 B2 8/2019 Furumura et al.
(Continued)

FOREIGN PATENT DOCUMENTS

CN 111801433 A 10/2020
JP H1161312 A 3/1999
(Continued)

OTHER PUBLICATIONS

Office Action from the Japanese Patent Office dispatched Sep. 30, 2025, in related Japanese application No. 2021-171857, and machine translation thereof.
(Continued)

*Primary Examiner* — Bryan M Lettman
(74) *Attorney, Agent, or Firm* — J-TEK LAW PLLC; Jeffrey D. Tekanic; Scott T. Wakeman

(57) ABSTRACT

An extruded, multi-hole pipe (1) has an aluminum alloy composition that contains Si: 0.30 mass % or more and 1.80 mass % or less, Cu: 0.10 mass % or more and 0.50 mass % or less, Mn: 0.30 mass % or more and 1.00 mass % or less, and Mg: 0.30 mass % or more and 1.00 mass % or less. The tensile strength of the extruded, multi-hole pipe (1) is 290 MPa or more.

20 Claims, 1 Drawing Sheet

(51) Int. Cl.
*B21C 37/15* (2006.01)
*C22C 21/02* (2006.01)
*C22F 1/05* (2006.01)

(58) Field of Classification Search
CPC ....... B21C 37/15; B21C 37/151; C22C 21/02; C22F 1/05
See application file for complete search history.

(56) References Cited

U.S. PATENT DOCUMENTS

| | | | |
|---|---|---|---|
| 11,591,674 B2 | 2/2023 | Kuramoto et al. | |
| 2007/0017605 A1 | 1/2007 | Nakamura et al. | |
| 2011/0114228 A1 | 5/2011 | Nakamura et al. | |
| 2012/0168045 A1 | 7/2012 | Ihara et al. | |
| 2015/0060035 A1 | 3/2015 | Furumura et al. | |
| 2018/0094881 A1 | 4/2018 | Furumura et al. | |
| 2021/0108293 A1 | 4/2021 | Kuramoto et al. | |
| 2021/0207249 A1* | 7/2021 | Guo | C22C 21/02 |

FOREIGN PATENT DOCUMENTS

| | | | |
|---|---|---|---|
| JP | 2001003128 | A | 1/2001 |
| JP | 2007031730 | A | 2/2007 |
| JP | 2009041045 | A | 2/2009 |
| JP | 2009046702 | A | 3/2009 |
| JP | 2011247459 | A | 12/2011 |
| JP | 2013204070 | A | 10/2013 |
| JP | 2015040340 | A | 3/2015 |
| JP | 2017048451 | A | 3/2017 |
| JP | 2017048452 | A | 3/2017 |
| JP | 2020066751 | A | 4/2020 |
| JP | 2020066752 | A | 4/2020 |
| JP | 2021059774 | A | 4/2021 |
| WO | 2011040453 | A1 | 4/2011 |
| WO | 2019167469 | A1 | 9/2019 |
| WO | 2019171818 | A1 | 9/2019 |
| WO | 2023068166 | A1 | 4/2023 |

OTHER PUBLICATIONS

English translation of the International Search Report dated Dec. 27, 2022, for PCT application No. PCT/JP2022/038245.
English translation of the International Search Report dated Dec. 27, 2022, for PCT application No. PCT/JP2022/038246.
English translation of the Written Opinion of the International Searching Authority for PCT application No. PCT/JP2022/038245.
English translation of the Written Opinion of the International Searching Authority for PCT application No. PCT/JP2022/038246.
Unpublished U.S. Appl. No. 18/692,573, first named inventor: Yuki Yamazaki, filing date: Mar. 15, 2024.
Unpublished U.S. Appl. No. 18/693,192, first named inventor: Taichi Suzuki , filing date: Mar. 19, 2024.
Extended European Search Report from the European Patent Office dated Jul. 7, 2025 in related EP application No. 22 883 471.9, including Search Opinion, Search Report and examined claims 1-6.
Office Action from the Chinese Patent Office dispatched Jun. 29, 2026, in counterpart CN application No. 202280062121.1, and translation thereof.

* cited by examiner

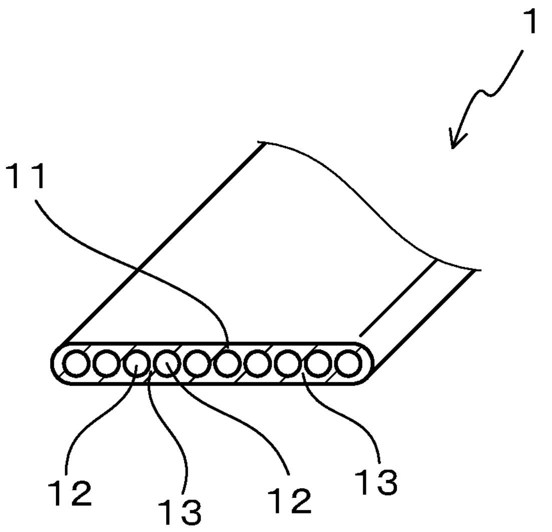
1
11
12
13
12
13

EXTRUDED, MULTI-HOLE-PIPE AND MANUFACTURING METHOD THEREOF

CROSS-REFERENCE

This application is the US national stage of International Patent Application No. PCT/JP2022/038246 filed on Oct. 13, 2022, which claims priority to Japanese Patent Application No. 2021-171857 filed on Oct. 20, 2021.

TECHNICAL FIELD

The present invention relates to an extruded, multi-hole pipe and a manufacturing method thereof.

BACKGROUND ART

An extruded, multi-hole pipe comprises: an outer-wall portion, which constitutes an outer-perimeter portion thereof; and partition portions, which partition the space surrounded by the outer-wall portion; and is formed such that a fluid can be caused to flow through passageways surrounded by the outer-wall portion and the partition portions. To form a complex, cross-sectional shape having such a fine structure by extrusion, extruded, multi-hole pipes are often constituted from an aluminum alloy having a relatively low alloying-element content and exceling in extrudability.

For example, in Patent Document 1, a heat-exchanger, extruded, flat, multi-hole pipe excelling in corrosion resistance is described that is composed of an aluminum alloy that contains, by mass %, Si: 0.01%-0.3%, Fe: 0.01%-0.3%, Cu: 0.05%-0.4%, Mn: 0.05%-0.3%, Zr: 0.05%-0.25%, and Ti: 0%-0.15% and in which the total of Zr and Ti is 0.3% or less, the remainder being composed of Al and unavoidable impurities, wherein, of the particles having a particle surface area of 1.0 $\mu m^2$ or more that are dispersed in the matrix, the surface-area ratio occupied by an AlFeSi stable phase is 0.1% or more and less than 0.5%.

PRIOR ART LITERATURE

Patent Documents

Patent Document 1
Japanese Laid-open Patent Publication 2009-46702

SUMMARY OF THE INVENTION

In recent years, there has been demand to further increase the strength of extruded, multi-hole pipes. To increase the strength of an extruded, multi-hole pipe, a method is conceivable that, to put it simply, increases the content of alloying elements that act to increase strength. However, because aluminum alloys that have high strength generally tend to have high deformation resistance during hot extrusion, there is a problem in that, when an attempt is made to increase the strength of an extruded, multi-hole pipe, it leads to degradation in extrudability, and therefore it becomes difficult to manufacture an extruded, multi-hole pipe having a complex cross-sectional shape by extrusion.

It is one non-limiting object of the present teachings to provide an extruded, multi-hole pipe having high strength, and a manufacturing method thereof.

In one aspect of the present teachings, an extruded, multi-hole pipe having a chemical preferably has an aluminum alloy composition that contains Si (silicon): 0.30 mass % or more and 1.80 mass % or less, Cu (copper): 0.10 mass % or more and 0.50 mass % or less, Mn (manganese): 0.30 mass % or more and 1.00 mass % or less, and Mg (magnesium): 0.30 mass % or more and 1.00 mass % or less, and has a tensile strength of 290 MPa or more.

In a manufacturing method of the extruded, multi-hole pipe according to the aspect described above:

- an ingot having the chemical composition is prepared;
- a homogenizing process is performed by holding the ingot at a temperature of 450° C. or higher and 620° C. or lower for 2 h or more;
- subsequently the extruded, multi-hole pipe is prepared by performing hot extrusion on the ingot;
- after the hot extrusion has completed, the extruded, multi-hole pipe is cooled such that the average cooling rate becomes 1° C./s or more until the temperature of the extruded, multi-hole pipe reaches 150° C.; and
- an artificial-aging process is performed by holding the extruded, multi-hole pipe after the cooling at a temperature of 150° C. or higher and 200° C. or lower for 2 h or more.

By at least having the chemical composition within the above-mentioned specific ranges, the extruded, multi-hole pipe can easily achieve a high tensile strength of 290 MPa or more. Furthermore, because it has the mechanical properties indicated by the tensile strength within the above-mentioned specific range, the extruded, multi-hole pipe has higher strength than existing extruded, multi-hole pipes.

In addition, in the manufacturing method according to the above-mentioned aspect, by performing the homogenizing process on the ingot having a chemical composition within the above-mentioned specific range under the above-mentioned specific conditions, an increase in deformation resistance of the ingot in subsequent hot extrusion can be curtailed. In addition, by performing cooling and the artificial-aging process, under the above-mentioned specific conditions, on the extruded, multi-hole pipe after hot extrusion, the strength of the extruded, multi-hole pipe can be increased.

According to the above-mentioned aspect as described above, an extruded, multi-hole pipe having high strength and a manufacturing method thereof can be provided.

BRIEF DESCRIPTION OF THE DRAWINGS

FIG. 1 is an oblique view of an extruded, multi-hole pipe according to Working Example 1.

DETAILED DESCRIPTION (Extruded, Multi-Hole Pipe)

The chemical composition, characteristics, structure, and the like of the above-mentioned extruded, multi-hole pipe will now be explained.

[Chemical Composition]

The above-mentioned extruded, multi-hole pipe contains Si, Cu, Mn, and Mg as essential components.

Si: 0.30 Mass % or More and 1.80 Mass % or Less

The above-mentioned extruded, multi-hole pipe contains 0.30 mass % or more and 1.80 mass % or less of Si as an essential component. In the extruded, multi-hole pipe, a portion of the Si, together with Mg, forms intermetallic compounds, such as $Mg_2Si$, which act to increase the strength of the extruded, multi-hole pipe by dispersion strengthening. In addition, the Si that did not form second phase particles forms a solid solution in the Al parent phase, which acts to increase the strength of the extruded, multi-hole pipe by solid-solution strengthening.

From the viewpoint of further increasing the strength of the extruded, multi-hole pipe, the Si content preferably is 0.50 mass % or more, more preferably is 0.70 mass % or more, and yet more preferably is 0.90 mass % or more. In the situation in which the Si content in the extruded, multi-hole pipe is less than 0.30 mass %, there is a risk that it will lead to a decrease in the strength of the extruded, multi-hole pipe.

On the other hand, when the Si content becomes excessively large, the amount of the Si that has formed a solid solution in the ingot will become large, and there is a risk that this will lead to an increase in deformation resistance during hot extrusion. By making the Si content 1.80 mass % or less, preferably 1.70 mass % or less, and more preferably 1.50 mass % or less, the strength of the extruded, multi-hole pipe can be increased while curtailing an increase in deformation resistance of the ingot during hot extrusion.

Mn: 0.30 Mass % or More and 1.00 Mass % or Less

The above-mentioned extruded, multi-hole pipe contains 0.30 mass % or more and 1.00 mass % or less of Mn as an essential component. In the extruded, multi-hole pipe, a portion of the Mn forms Al—Mn-series intermetallic compounds in the Al parent phase, which act to increase the strength of the extruded, multi-hole pipe by dispersion strengthening. In addition, the Mn that did not form second phase particles forms a solid solution in the Al parent phase, which acts to increase the strength of the extruded, multi-hole pipe by solid-solution strengthening.

From the viewpoint of further increasing the strength of the extruded, multi-hole pipe, the Mn content preferably is 0.40 mass % or more, more preferably is 0.50 mass % or more, and yet more preferably is 0.60 mass % or more. In the situation in which the Mn content in the extruded, multi-hole pipe is less than 0.30 mass %, there is a risk that it will lead to a decrease in the strength of the extruded, multi-hole pipe.

On the other hand, when the Mn content becomes excessively large, the amount of Mn that forms a solid solution in the ingot becomes large, and there is a risk that this will lead to an increase in deformation resistance during hot extrusion. By making the Mn content 1.00 mass % or less and preferably 0.95 mass % or less, the strength of the extruded, multi-hole pipe can be increased while curtailing an increase in deformation resistance of the ingot during hot extrusion.

Cu: 0.10 Mass % or More and 0.50 Mass % or Less

The above-mentioned extruded, multi-hole pipe contains 0.10 mass % or more and 0.50 mass % or less of Cu as an essential component. In the extruded, multi-hole pipe, Cu forms a solid solution in the Al parent phase, which acts to increase the strength of the extruded, multi-hole pipe by solid-solution strengthening. From the viewpoint of further increasing the strength of the extruded, multi-hole pipe, the Cu content preferably is 0.15 mass % or more and more preferably is 0.20 mass % or more. In the situation in which the Cu content in the extruded, multi-hole pipe is less than 0.10 mass %, there is a risk that it will lead to a decrease in the strength of the extruded, multi-hole pipe. In addition, in this situation, there is a risk that it will lead to degradation in the surface properties, such as an increase in surface roughness.

On the other hand, when the Cu content becomes excessively large, the amount of the Cu that has formed a solid solution in the ingot during the manufacturing process of the above-mentioned extruded, multi-hole pipe becomes large, and there is a risk that this will lead to an increase in deformation resistance and a decrease in extrudability during hot extrusion. By making the Cu content 0.50 mass % or less and preferably 0.40 mass % or less, the strength of the extruded, multi-hole pipe can be increased while curtailing an increase in deformation resistance during hot extrusion.

Mg: 0.30 Mass % or More and 1.00 Mass % or Less

The above-mentioned extruded, multi-hole pipe contains 0.30 mass % or more and 1.00 mass % or less of Mg as an essential component. In the extruded, multi-hole pipe, a portion of the Mg, together with Si, forms intermetallic compounds, such as $Mg_2Si$, which act to increase the strength of the extruded, multi-hole pipe by dispersion strengthening. In addition, the Mg that has not formed second phase particles forms a solid solution in the Al parent phase, which acts to increase the strength of the extruded, multi-hole pipe by solid-solution strengthening.

From the viewpoint of further increasing the strength of the extruded, multi-hole pipe, the Mg content preferably is 0.40 mass % or more, and more preferably is 0.45 mass % or more. In the situation in which the Mg content in the extruded, multi-hole pipe is less than 0.30 mass %, there is a risk that it will lead to a decrease in the strength of the extruded, multi-hole pipe.

On the other hand, when the Mg content becomes excessively large, the amount of the Mg that forms a solid solution in the ingot in the manufacturing process of the above-mentioned extruded, multi-hole pipe becomes large, and there is a risk that this will lead to an increase of deformation resistance and a decrease in extrudability during hot extrusion. By making the Mg content 1.00 mass % or less, preferably 0.95 mass % or less, and more preferably 0.90 mass % or less, the strength of the extruded, multi-hole pipe can be increased while curtailing an increase in deformation resistance during hot extrusion.

In addition to the essential components described above, the extruded, multi-hole pipe may further contain, as optional components, one or two or more elements selected from the group consisting of Fe (iron), Zn (zinc), Cr (chromium), Ti (titanium), Zr (zirconium), and B (boron).

Fe: 0.40 Mass % or Less

The above-mentioned extruded, multi-hole pipe may contain greater than 0 mass % and 0.40 mass % or less of Fe as an optional component. Fe acts to increase the strength of the extruded, multi-hole pipe. From the viewpoint of further increasing the strength of the extruded, multi-hole pipe, the Fe content preferably is 0.05 mass % or more, more preferably is 0.10 mass % or more, yet more preferably is 0.15 mass % or more, and particularly preferably is 0.20 mass % or more.

On the other hand, if the Fe content becomes excessively high, coarse Al—Fe-series intermetallic compounds tend to be formed in the ingot in the manufacturing process of the above-mentioned extruded, multi-hole pipe. There is a risk that coarse Al—Fe-series intermetallic compounds in the ingot will lead to degradation in the surface properties of the extruded, multi-hole pipe, such as an increase in surface roughness, which is not preferable. By making the Fe content to be 0.40 mass % or less and preferably to be 0.35 mass % or less, the strength of the extruded, multi-hole pipe can be increased while avoiding degradation in surface properties.

Cr: 0.10 Mass % or Less

The above-mentioned extruded, multi-hole pipe may contain greater than 0 mass % and 0.10 mass % or less of Cr as an optional component. Cr acts to increase the fineness of crystal grains in the metallographic structure of the extruded, multi-hole pipe. From the viewpoint of further enhancing this effect, the Cr content preferably is 0.005 mass % or more, and more preferably is 0.010 mass % or more.

On the other hand, when the Cr content becomes excessively high, coarse Al—Cr-series intermetallic compounds tend to form in the ingot. When coarse Al—Cr-series intermetallic compounds exist in the ingot, there is a risk that cracks will tend to form during hot extrusion or during secondary processing after hot extrusion, which is not preferable. By making the Cr content to be 0.10 mass % or less, preferably 0.090 mass % or less, and more preferably 0.080 mass % or less, the crystal grains in the metallographic structure of the extruded, multi-hole pipe can be made sufficiently fine while avoiding the formation of coarse Al—Cr-series intermetallic compounds.

Zn: 0.60 Mass % or Less

The above-mentioned extruded, multi-hole pipe may contain greater than 0 mass % and 0.60 mass % or less of Zn as an optional component. Zn, together with Mg, forms precipitates, which act to increase the strength of the extruded, multi-hole pipe by precipitation strengthening. From the viewpoint of further enhancing these functions and effects, the Zn content preferably is 0.05 mass % or more, more preferably is 0.10 mass % or more, and yet more preferably is 0.15 mass % or more.

On the other hand, when the Zn content becomes excessively high, the solidus temperature of the aluminum alloy decreases, and consequently there is a risk that partial melting of the ingot or the extruded, multi-hole pipe will tend to occur during the homogenizing process or during hot extrusion. By making the Zn content to be 0.60 mass % or less and preferably to be 0.55 mass % or less, the functions and effects due to Zn can be obtained while avoiding partial melting of the ingot or the extruded, multi-hole pipe.

Ti: 0.10 Mass % or Less

The above-mentioned extruded, multi-hole pipe may contain greater than 0 mass % and 0.10 mass % or less of Ti as an optional component. Ti acts to increase the fineness of the crystal grains in the metallographic structure of the extruded, multi-hole pipe. From the viewpoint of further enhancing such an effect, the Ti content preferably is 0.005 mass % or more, and more preferably is 0.010 mass % or more.

On the other hand, when the Ti content becomes excessively high, coarse Al—Ti-series intermetallic compounds tend to be formed in the ingot. When coarse Al—Ti-series intermetallic compounds exist in the ingot, there is a risk that cracks will tend to form during hot extrusion or during secondary processing after hot extrusion, which is not preferable. By making the Ti content to be 0.10 mass % or less, preferably 0.090 mass % or less, and more preferably 0.080 mass % or less, the crystal grains in the metallographic structure of the extruded, multi-hole pipe can be made sufficiently fine while avoiding the formation of coarse Al—Ti-series intermetallic compounds.

Zr: 0.10 Mass % or Less

The above-mentioned extruded, multi-hole pipe may contain greater than 0 mass % and 0.10 mass % or less of Zr as an optional component. Zr acts to increase the fineness of crystal grains in the metallographic structure of the extruded, multi-hole pipe. From the viewpoint of further enhancing this effect, the Zr content preferably is 0.005 mass % or more, and more preferably is 0.010 mass % or more.

On the other hand, when the Zr content becomes excessively large, coarse Al—Zr-series intermetallic compounds tend to form in the ingot. When coarse Al—Zr-series intermetallic compounds exist in the ingot, there is a risk that cracks will tend to form during hot extrusion or during secondary processing after hot extrusion, which is not preferable. By making the Zr content 0.10 mass % or less, preferably 0.090 mass % or less, and more preferably 0.080 mass % or less, the crystal grains in the metallographic structure of the extruded, multi-hole pipe can be made sufficiently fine while avoiding the formation of coarse Al—Zr-series intermetallic compounds.

B: 0.10 Mass % or Less

The above-mentioned extruded, multi-hole pipe may contain greater than 0 mass % and 0.10 mass % or less of B. By making the B content in the extruded, multi-hole pipe to be within the above-mentioned specific range, the crystal grains in the metallographic structure of the extruded, multi-hole pipe can be made sufficiently fine. From the viewpoint of more reliably obtaining such functions and effects, the B content in the extruded, multi-hole pipe preferably is 0.005 mass % or more and 0.090 mass % or less and more preferably is 0.010 mass % or more and 0.080 mass % or less.

Other Elements

The extruded, multi-hole pipe may contain, as unavoidable impurities, elements other than the elements described above. For example, V (vanadium), etc. can be given as examples of such elements. The content of the elements existing as unavoidable impurities should be, for example, 0.05 mass % or less for each element. In addition, the total content of the elements existing as unavoidable impurities should be 0.50 mass % or less.

From the viewpoint of more reliably obtaining the effects of increasing strength and increasing extrudability in the manufacturing process, which were described above, the above-mentioned extruded, multi-hole pipe preferably has a chemical composition that contains Si: 0.70 mass % or more and 1.70 mass % or less, Fe: 0.15 mass % or more and 0.40 mass % or less, Cu: 0.15 mass % or more and 0.50 mass % or less, Mn: 0.50 mass % or more and 1.00 mass % or less, Mg: 0.40 mass % or more and 0.95 mass % or less, Cr: 0.005 mass % or more and 0.090 mass % or less, Zn: 0.10 mass % or more and 0.60 mass % or less, Ti: 0.005 mass % or more and 0.090 mass % or less, Zr: 0.005 mass % or more and 0.090 mass % or less, and B: 0.005 mass % or more and 0.090 mass % or less, the remainder being composed of Al and unavoidable impurities.

From the same viewpoint, the above-mentioned extruded, multi-hole pipe preferably has a chemical composition that essentially contains Si: 0.90 mass % or more and 1.50 mass % or less, Fe: 0.20 mass % or more and 0.35 mass % or less, Cu: 0.20 mass % or more and 0.40 mass % or less, Mn: 0.60 mass % or more and 0.95 mass % or less, Mg: 0.45 mass % or more and 0.90 mass % or less, Cr: 0.010 mass % or more and 0.080 mass % or less, Zn: 0.15 mass % or more and 0.55 mass % or less, Ti: 0.010 mass % or more and 0.080 mass % or less, Zr: 0.010 mass % or more and 0.080 mass % or less, and B: 0.010 mass % or more and 0.080 mass % or less, the remainder being composed of Al and unavoidable impurities.

[Properties]

The tensile strength of the above-mentioned extruded, multi-hole pipe is 290 MPa or more. An extruded, multi-hole pipe having a tensile strength within the above-mentioned specific range has a strength greater than that of conventional extruded, multi-hole pipes.

[Shape]

The extruded, multi-hole pipe has: an outer-wall portion, which partitions the exterior space and the interior of the above-mentioned extruded, multi-hole pipe; and a plurality of partition portions, which partitions the interior space of the above-mentioned outer-wall portion. In addition, the extruded, multi-hole pipe has a plurality of passageways that are surrounded by the outer-wall portion and the partition portions and are configured such that a liquid, a gas, or the like can be caused to circulate through these passageways. The cross-sectional shape of the extruded, multi-hole pipe is not particularly limited and, for example, can take on a variety of cross-sectional shapes such as an elliptical shape, an oblong shape, and the like. In addition, the cross-sectional shape of the passageways of the extruded, multi-hole pipe are likewise not particularly limited and, for example, can take on a variety of cross-sectional shapes such as a circular shape, a triangular shape, a quadrangular shape, and the like.

The extruded, multi-hole pipe may have a flat, cross-sectional shape. In this situation, the width-to-thickness ratio of the extruded, multi-hole pipe can be made to be 5 or more and 30 or less. Generally, in the situation in which the extruded, multi-hole pipe has a flat shape, the higher the width-to-thickness ratio, the more difficult that extrusion becomes, and the greater the extrudability that is required. In the manufacturing process of the above-mentioned extruded, multi-hole pipe, by performing the homogenizing process on the aluminum-alloy ingot having the above-mentioned specific chemical composition under the above-mentioned specific conditions, an increase in deformation resistance during hot extrusion can be curtailed, and thereby extrudability can be increased. For this reason, an extruded, multi-hole pipe having a cross-sectional shape requiring such great extrudability and having high strength can be obtained easily.

In addition, the extruded, multi-hole pipe may have an outer-wall portion, which partitions the exterior space and the interior of the above-mentioned extruded, multi-hole pipe, and a plurality of partition portions, which partitions the interior space of the above-mentioned outer-wall portion, wherein the thickness of the above-mentioned outer-wall portion and the above-mentioned partition portions may be 0.2 mm or more and 2.0 mm or less. In the extruded, multi-hole pipe, the same as in the width-to-thickness ratio described above, the thinner the thickness of the outer-wall portion and the partition portions, the more difficult that extrusion becomes, and the greater the extrudability that is required. In the process of manufacturing the above-mentioned extruded, multi-hole pipe, by performing the homogenizing process on the aluminum-alloy ingot having the above-mentioned specific chemical composition under the above-mentioned specific conditions, an increase in deformation resistance during hot extrusion can be curtailed, and thereby extrudability can be increased. For this reason, an extruded, multi-hole pipe having a cross-sectional shape requiring such great extrudability and having high strength can be obtained easily.

(Manufacturing Method of Extruded, Multi-Hole-Pipe)

In preparing the above-mentioned extruded, multi-hole pipe, it suffices that:

- an ingot having the above-mentioned chemical composition is prepared;
- a homogenizing process is performed by holding the above-mentioned ingot at a temperature of 450° C. or higher and 620° C. or lower for 2 h or more;
- subsequently, hot extrusion is performed on the above-mentioned ingot to prepare the above-mentioned extruded, multi-hole pipe;
- after the above-mentioned hot extrusion has completed, the above-mentioned extruded, multi-hole pipe is cooled such that the average cooling rate is 1° C./s or more until the temperature of the above-mentioned extruded, multi-hole pipe reaches 150° C.; and
- an artificial-aging process is performed on the above-mentioned extruded, multi-hole pipe after the above-mentioned cooling by holding the above-mentioned extruded, multi-hole pipe at a temperature of 150° C. or higher and 200° C. or lower for 2 h or more.

In the preparation of the ingot, a well-known casting method, such as DC casting or CC casting, can be used. For example, aluminum virgin metal, aluminum scrap material, or the like can be used as the casting material when preparing the ingot.

In the above-mentioned extruded, multi-hole-pipe manufacturing method, it is preferable to use aluminum scrap material as at least a portion of the casting material. Here, end materials and chips produced in manufacturing processes of aluminum products, used aluminum products, aluminum products that have been separated from used products, and the like are included in aluminum scrap material.

In recent years, the importance of techniques to reuse aluminum scrap material as a casting material has increased owing to the rise in environmental awareness. However, aluminum scrap material contains various elements other than aluminum. In addition, aluminum scrap material may also contain metal materials other than aluminum, such as iron, depending on the situation. Consequently, in the situation in which aluminum scrap material is reused as the casting material, the content of elements other than aluminum becomes high, which leads to the occurrence of various problems such as an increase in deformation resistance during hot extrusion and a decrease in extrusion speed. For this reason, in the existing state of the art, in the situation in which aluminum scrap material is used as a casting material, it is considered difficult to manufacture an extruded, multi-hole pipe having a complex, cross-sectional shape.

In contrast, in the above-mentioned extruded, multi-hole-pipe manufacturing method, the chemical composition of the ingot is made to be within the above-mentioned specific ranges, and moreover by performing the homogenizing process under the above-mentioned specific conditions, an increase in deformation resistance during hot extrusion can be curtailed even in the situation in which the content of elements other than aluminum is relatively high. For this reason, according to the manufacturing method in the above-mentioned aspect, even in the situation in which aluminum scrap material is used as at least a portion of the casting material, an extruded, multi-hole pipe having a complex, cross-sectional shape and high strength can be manufactured easily.

Furthermore, by using aluminum scrap material as at least a portion of the casting material, the amount of aluminum virgin metal used can be reduced. As a result, the environmental load can be further reduced in manufacturing processes of extruded, multi-hole pipes, and the cost of materials of the extruded, multi-hole pipe can be further lowered. From the viewpoint of further enhancing such effects, the proportion of the aluminum scrap material in the casting material preferably is made to be 50 mass % or more, more preferably is made to be 75 mass % or more, and particularly preferably is made to be 100 mass %, i.e., using aluminum scrap material alone as the casting material.

In the above-mentioned extruded, multi-hole-pipe manufacturing method, after the ingot has been prepared, a homogenizing process is performed by holding the ingot at a temperature of 450° C. or higher and 620° C. or lower for 2 h or more. By setting the hold temperature and the hold time in the homogenizing process respectively to the above-mentioned specific ranges, coarse crystallized products in the ingot can disintegrate, granulate, and thereby once again form a solid solution in the Al parent phase.

From the viewpoint of further promoting the disintegration and the like of crystallized products in the ingot, it is preferable that the hold temperature in the homogenizing process is 550° C. or higher and 600° C. or lower. From the same viewpoint, it is preferable that the hold time in the homogenizing process is 10 h or more. In addition, the hold time in the homogenizing process preferably is 24 h or less from the viewpoint of productivity.

In the situation in which the hold temperature in the homogenizing process is lower than 450° C. or in the situation in which the hold time is less than 2 h, there is a risk that the disintegration and the like of the crystallized products will become insufficient. In the situation in which the hold temperature in the homogenizing process is higher than 620° C., there is a risk that the ingot will partially melt.

In the above-mentioned extruded, multi-hole-pipe manufacturing method, a further homogenizing process can also be performed, as needed, on the ingot after the homogenizing process has been performed under the above-mentioned specific conditions. It is noted that, hereinbelow, in the situation in which the homogenizing process is performed in two stages, the first homogenizing process is called "first homogenizing process," and the second homogenizing process is called "second homogenizing process."

The hold temperature in the second homogenizing process preferably is 400° C. or higher and 550° C. or lower, and the hold time preferably is 2 h or more. As described above, the first homogenizing process is performed for the principal purpose of disintegrating, granulating, and once again forming a solid solution of the coarse crystallized products that crystallized in the ingot during casting. However, in the situation in which the hold temperature and the hold time in the first homogenizing process have been set to within the above-mentioned specific ranges, the disintegration and granulation of the crystallized products and the re-forming of a solid solution are promoted, and the formation of a solid solution of Mn and Si, which are solute elements, in the Al parent phase is also promoted. When the solid solution amounts of solute elements in the Al parent phase becomes excessively large, it leads to a decrease in the speed with which dislocations move in the parent phase during hot extrusion, and thereby deformation resistance tends to increase.

In contrast, in the second homogenizing process, when the ingot is heated under the above-mentioned specific conditions, the Si and Mn that have formed a solid solution in the Al parent phase in the first homogenizing process can be caused to finely precipitate as Al—Mn—Si-series intermetallic compounds. As a result, the solid solution amounts of solute elements in the Al parent phase can be reduced, and thereby deformation resistance during hot extrusion can be further decreased. Accordingly, by performing the second homogenizing process by heating the ingot, under the above-mentioned specific conditions, after the first homogenizing process has been performed, extrudability during hot extrusion can be further increased.

It is noted that the hold time in the second homogenizing process preferably is 24 h or less from the viewpoint of productivity, and more preferably is 15 h or less.

In the above-mentioned manufacturing method, the first homogenizing process and the second homogenizing process can be performed in series. Here, performing the first homogenizing process and the second homogenizing process in series means that, after the first homogenizing process has completed, the temperature of the ingot is lowered until the hold temperature of the second homogenizing process, and the second homogenizing process is started at the point in time at which the temperature of the ingot has reached the hold temperature of the second homogenizing process.

In addition, in the above-mentioned manufacturing method, after the first homogenizing process has been completed, it is also possible to first cool the ingot to a temperature that is lower than the hold temperature of the second homogenizing process and subsequently to perform the second homogenizing process. In this situation, for example, once the ingot has been cooled to a temperature of 200° C. or lower after the first homogenizing process has completed, the second homogenizing process should be performed by subsequently heating the ingot.

In the above-mentioned extruded, multi-hole-pipe manufacturing method, by performing hot extrusion on the ingot after the homogenizing process has been completed, the extruded, multi-hole pipe can be obtained. During hot extrusion, the temperature of the ingot at the start of extrusion, the temperature of the extruded, multi-hole pipe at the completion of extrusion, and the like should be set as appropriate in accordance with the chemical composition of the extruded, multi-hole pipe. For example, the temperature of the ingot at the start of extrusion can be set as appropriate to within the range of 440° C. or higher and 560° C. or lower. In addition, the temperature of the extruded, multi-hole pipe immediately after extrusion end can be set as appropriate within the range of 400° C. or higher and 500° C. or lower.

In the above-mentioned extruded, multi-hole-pipe manufacturing method, immediately after hot extrusion has completed, the extruded, multi-hole pipe is cooled such that the average cooling rate becomes 1° C./s or more until the temperature of the extruded, multi-hole pipe reaches 150° C. A variety of methods, such as open cooling, fan cooling, water cooling, and the like, can be used for cooling the extruded, multi-hole pipe. In addition, the temperature of the extruded, multi-hole pipe at the time of cooling end should be, for example, 150° C. or lower.

By cooling the extruded, multi-hole pipe immediately after hot extrusion under the above-mentioned specific conditions, the state in which solute elements have formed a solid solution in the Al parent phase can be maintained while curtailing the precipitation of solute elements, such as Si and Mg, that have formed a solid solution in the extruded, multi-hole pipe. Furthermore, by thusly maintaining the state in which solute elements have formed a solid solution in the Al parent phase, intermetallic compounds, such as $Mg_2Si$, can be finely precipitated in the Al parent phase in the artificial-aging process, which is performed afterward.

In the state in which the average cooling rate of the extruded, multi-hole pipe after hot extrusion is slower than 1° C./s, solute elements tend to precipitate during cooling. Consequently, in this situation, there is a risk that it will lead to a decrease in the strength of the extruded, multi-hole pipe after the artificial-aging process. It is noted that, from the viewpoint of avoiding a decrease in the strength of the ultimately obtained extruded, multi-hole pipe, although there is no upper limit for the average cooling rate of the extruded, multi-hole pipe, if an attempt is made to increase the average cooling rate, there is a risk that it will lead to an increase in the manufacturing cost. From the viewpoint of avoiding an increase in the manufacturing cost, it is preferable to set the average cooling rate of the extruded, multi-hole pipe after hot extrusion to 300° C./s or less.

In the above-mentioned manufacturing method, the artificial-aging process is performed by holding the extruded, multi-hole pipe after cooling end at a temperature of 150° C. or higher and 200° C. or lower for 2 h or more. By performing the artificial-aging process by heating the extruded, multi-hole pipe under the above-mentioned specific conditions, solute elements that have formed a solid solution in the Al parent phase of the extruded, multi-hole pipe can be caused to precipitate, and thereby fine intermetallic compounds, such as $Mg_2Si$, can form in the Al parent phase. As a result, the strength of the extruded, multi-hole pipe can be increased by dispersion strengthening.

From the viewpoint of more reliably obtaining the effect of increasing strength by dispersion strengthening, the hold temperature in the artificial-aging process preferably is 160° C. or higher and 190° C. or lower. From the same viewpoint, the hold time in the artificial-aging process preferably is 5 h or more and more preferably is 8 h or more. It is noted that the hold time in the artificial-aging process preferably is 24 h or less from the viewpoint of productivity.

In the situation in which the hold temperature in the artificial-aging process is lower than 150° C. or in the situation in which the hold time is less than 2 h, precipitation of solute elements becomes insufficient, and there is a risk that this will lead to a decrease in the strength of the extruded, multi-hole pipe. In addition, in the situation in which the hold temperature in the artificial-aging process is higher than 200° C., crystallized products, precipitates, and the like existing in the extruded, multi-hole pipe will tend to once again form a solid solution in the Al parent phase, and there is a risk that the desired characteristics will no longer be obtained.

The extruded, multi-hole pipe obtained in this manner may be used as is or may be used after the performance of a postprocess, such as: drawing work for adjusting dimensions, shape, or the like; zinc spraying to increase corrosion resistance; coating; or the like. These postprocesses can be combined as appropriate in accordance with the application or the like of the extruded, multi-hole pipe.

WORKING EXAMPLES

Working examples of the above-mentioned extruded, multi-hole pipe and the manufacturing method thereof will be explained below. The extruded, multi-hole pipe according to the present example has a chemical composition that contains Si: 0.30 mass % or more and 1.80 mass % or less, Cu: 0.10 mass % or more and 0.50 mass % or less, Mn: 0.30 mass % or more and 1.00 mass % or less, and Mg: 0.30 mass % or more and 1.00 mass % or less, the remainder being composed of Al and unavoidable impurities. In addition, the tensile strength of the extruded, multi-hole pipe is 290 MPa or more.

As shown in FIG. 1, an extruded, multi-hole pipe 1 according to the present example has a flat, cross-sectional shape. More specifically, the extruded, multi-hole pipe 1 has an elliptical, cross-sectional shape. The width of the extruded, multi-hole pipe 1 is, for example, 60.0 mm, and the thickness is, for example, 3.0 mm.

In addition, the extruded, multi-hole pipe 1 has an outer-wall portion 11, which partitions the exterior space and the interior thereof, and partition portions 13, which partition the space surrounded by the outer-wall portion 11 into ten passageways 12. Each of the passageways 12 of the extruded, multi-hole pipe 1 in the present example has a circular, cross-sectional shape. The thickness of the thinnest portion of the outer-wall portion 11 is, for example, 1.2 mm, and the thickness of the thinnest portion of the partition portions 13 is, for example, 0.6 mm.

The extruded, multi-hole pipe according to the present example can be prepared by, for example, the following method. First, casting materials containing aluminum scrap material were used to prepare, by DC casting, ingots having the chemical compositions (alloy symbols A1-A2) listed in Table 1. It is noted that "Bal." in Table 1 is a notation indicating that that element is the remainder.

After the ingots had been prepared, a first homogenizing process was performed by holding the ingots at a temperature of 560° C. for 6 h. After the first homogenizing process completed, a second homogenizing process was performed by holding the ingots at a temperature of 480° C. for 8 h. The first homogenizing process and the second homogenizing process may be performed in series; or, in the interval from when the first homogenizing process has completed until the second homogenizing process is performed, the temperature of the ingots may be lowered below the hold temperature of the second homogenizing process.

After the second homogenizing process has completed, the ingot is heated until the temperature of the ingot becomes 500° C. In the state in which this temperature is maintained, hot extrusion is performed on the ingot; next, the extruded, multi-hole pipe 1 immediately after the hot extrusion is cooled such that the average cooling rate becomes 1° C./s until the extruded, multi-hole pipe 1 reaches 150° C. After the cooling has completed, the artificial-aging process is performed by holding the extruded, multi-hole pipe 1 at a temperature of 180° C. for 8 h.

Based on the above, Test Materials S1-S2 listed in Table 2 could be obtained. It is noted that Test Materials R1-R2 listed in Table 2 were test materials for comparison with Test Materials S1-S2. The method of preparing Test Materials R1-R2 was the same as that for Test Materials S1-S2, other than that the chemical compositions of the ingots were changed to Alloy Symbols A3-A4 listed in Table 1.

The tensile strength, the extrudability, and the evaluating method of each of the test materials will be explained below.

Tensile Strength

First, each test material was cut, and a test piece having a length of 60 mm was obtained. The length and mass of each test piece were accurately measured, and the cross-sectional area of each test piece was calculated based on these values and the density of the aluminum alloys that constitutes each test piece. Next, each test piece was mounted between a fixed chuck and a movable chuck of a tension tester. Furthermore, the movable chuck was caused to move at a pulling rate of 2 mm/min to add tensile force to each test piece, and thereby a load-displacement curve was obtained. The tensile strength and the value of the 0.2% proof stress were calculated based on the load-displacement curve obtained in this manner and the cross-sectional area of each test piece obtained by the method described above. In addition, the elongation value was calculated based on the load-displacement curve. The tensile strength, the 0.2% proof stress, and the elongation of each test piece are listed in Table 2.

Extrudability

It was possible to evaluate extrudability based on the external appearance of each test material. More specifically, the external appearance of each test material was observed visually, and the presence/absence of cracks, streak patterns along the extrusion direction, and the like was evaluated. The presence/absence of cracks and streak patterns at the end portion of each test material is listed in Table 2.

TABLE 1

| Alloy Symbol | Chemical Composition (mass %) Si | Fe | Cu | Mn | Mg | Cr | Zn | Ti | Zr | Al |
|---|---|---|---|---|---|---|---|---|---|---|
| A1 | 1.13 | 0.26 | 0.28 | 0.68 | 0.49 | 0.01 | 0.44 | 0.04 | 0.04 | Bal. |
| A2 | 1.43 | 0.28 | 0.37 | 0.93 | 0.49 | 0.01 | 0.58 | 0.05 | 0.06 | Bal. |
| A3 | 0.57 | 0.24 | 0.35 | 0.00 | 1.07 | 0.06 | 0.00 | 0.01 | 0.00 | Bal. |
| A4 | 0.70 | 0.16 | 0.00 | 0.03 | 0.68 | 0.00 | 0.00 | 0.01 | 0.00 | Bal. |

TABLE 2

| Test Material Symbol | Alloy Symbol | Tensile Strength (MPa) | 0.2% Proof Stress (MPa) | Elongation (%) | Extrudability Cracks in End Portion | Streak Pattern |
|---|---|---|---|---|---|---|
| S1 | A1 | 301 | 244 | 16.0 | None | None |
| S2 | A2 | 315 | 258 | 14.2 | None | None |
| R1 | A3 | 268 | 220 | 15.0 | None | None |
| R2 | A4 | 261 | 227 | 16.0 | None | None |

As shown in Table 1 and Table 2, Test Materials S1-S2 had the above-mentioned specific chemical compositions. In addition, in the manufacturing process of Test Materials S1-S2, the homogenizing process, hot extrusion, cooling, and the artificial-aging process were performed under the above-mentioned specific conditions on the ingots having the above-mentioned specific chemical compositions. For this reason, Test Materials S1-S2 each had high strength, excelled in extrudability during hot extrusion, and had a satisfactory external appearance.

On the other hand, Test Material R1 did not contain Mn. Consequently, the strength of Test Material R1 was lower than that of Test Materials S1-S2.

Test Material R2 did not contain Cu, and its Mn content was below the above-mentioned specific range. Consequently, the strength of Test Material R2 was lower than that of Test Materials S1-S2.

Specific aspects of the extruded, multi-hole pipe and the manufacturing method thereof according to the present invention were explained above based on the working examples, but the specific aspects of the extruded, multi-hole pipe and the manufacturing method thereof according to the present invention are not limited to the aspects of the working examples, and the composition can be modified as appropriate within a range that does not depart from the gist of the present invention.

The invention claimed is:

1. An extruded, multi-hole pipe having an aluminum alloy composition that contains Si: 0.30 mass % or more and 1.80 mass % or less, Cu: 0.10 mass % or more and 0.50 mass % or less, Mn: 0.30 mass % or more and 1.00 mass % or less, and Mg: 0.30 mass % or more and 1.00 mass % or less, Zn: 0.60 mass % or less and 0.05 mass % or more, and B: 0.10 mass % or less and 0.005 mass % or more, and having a tensile strength of 290 MPa or more.

2. The extruded, multi-hole pipe according to claim 1, wherein the extruded, multi-hole pipe further contains Fe: 0.40 mass % or less, Cr: 0.080 mass % or less, Ti: 0.10 mass % or less, Zr: 0.10 mass % or less, the balance being aluminum and unavoidable impurities.

3. The extruded, multi-hole pipe according to claim 2, wherein:

the extruded, multi-hole pipe has a flat cross-sectional shape; and the ratio of width to thickness of the extruded, multi-hole pipe is 5 or more and 30 or less.

4. The extruded, multi-hole pipe according to claim 2, wherein:

the extruded, multi-hole pipe has: an outer-wall portion, which partitions the exterior space and the interior of the extruded, multi-hole pipe; and a plurality of partition portions, which partitions the outer-wall portion and the interior space; and the thickness of the outer-wall portion and of the partition portions is 0.2 mm or more and 2.0 mm or less.

5. A manufacturing method of the extruded, multi-hole pipe according to claim 2, comprising:

preparing an ingot having the chemical composition;

performing a homogenizing process by holding the ingot at a temperature of 450° C. or higher and 620° C. or lower for 2 h or more;

subsequently preparing the extruded, multi-hole pipe by performing hot extrusion on the ingot;

after the hot extrusion has completed, cooling the extruded, multi-hole pipe such that the average cooling rate becomes 1° C./s or more until the temperature of the extruded, multi-hole pipe reaches 150° C.; and performing an artificial-aging process by holding the extruded, multi-hole pipe after the cooling at a temperature of 150° C. or higher and 200° C. or lower for 2 h or more.

6. The manufacturing method of the extruded, multi-hole pipe according to claim 5, wherein aluminum scrap material is used as at least a portion of the casting material when preparing the ingot.

7. The extruded, multi-hole-pipe manufacturing method according to claim 5, wherein at least 50 mass % of casting materials used to prepare the ingot are aluminum scrap material.

8. The extruded, multi-hole-pipe manufacturing method according to claim 7, wherein:

in the homogenizing process, the ingot is held at a temperature of 550-600° C. for 10 h or more; and in the artificial-aging process, the extruded, multi-hole pipe is held at a temperature of 160-190° C. for 5 h or more.

9. The extruded, multi-hole pipe according to claim 1, wherein the aluminum alloy composition consists of Si: 0.30-1.80 mass %, Cu: 0.10-0.50 mass %, Mn: 0.30-1.00 mass %, Mg: 0.30-1.00 mass %, Fe: 0.40 mass % or less, Zn: 0.05-0.60 mass % or less, Cr: 0.10 mass % or less, Ti: 0.005-0.10 mass % or less, Zr: 0.10 mass % or less, and B: 0.005-0.10 mass % or less, the remainder being Al and unavoidable impurities.

10. The extruded, multi-hole pipe according to claim 9, wherein the aluminum alloy composition contains 0.90-1.70 mass % Si.

11. The extruded, multi-hole pipe according to claim 9, wherein the aluminum alloy composition contains 0.60-1.00 mass % Mn.

12. The extruded, multi-hole pipe according to claim 9, wherein the aluminum alloy composition contains 0.20-0.50 mass % Cu.

13. The extruded, multi-hole pipe according to claim 9, wherein the aluminum alloy composition contains 0.30-0.90 mass % Mg.

14. The extruded, multi-hole pipe according to claim 9, wherein the aluminum alloy composition contains 0.20-0.40 mass % Fe.

15. The extruded, multi-hole pipe according to claim 9, wherein the aluminum alloy composition contains 0.005-0.080 mass % Cr.

16. The extruded, multi-hole pipe according to claim 9, wherein the aluminum alloy composition contains 0.15-0.60 mass % Zn.

17. The extruded, multi-hole pipe according to claim 9, wherein the aluminum alloy composition contains 0.010-0.10 mass % Ti.

18. The extruded, multi-hole pipe according to claim 8, wherein the aluminum alloy composition contains 0.005-0.10 mass % Zr.

19. The extruded, multi-hole pipe according to claim 1, wherein the aluminum alloy composition consists of 0.70-1.70 Si, 0.15-0.40 mass % Fe, 0.15-0.50 mass % Cu, 0.50-1.00 mass % Mn, 0.40-0.95 mass % Mg, 0.005-0.090 mass % Cr, 0.10-0.60 mass % Zn, 0.005-0.090 mass % Ti, 0.005-0.090 mass % Zr, and 0.005-0.090 mass % B, the remainder being Al and unavoidable impurities.

20. A method, comprising:

providing an aluminum alloy composition containing Si: 0.30-1.80 mass %, Cu: 0.10-0.50 mass %, Mn: 0.30-1.00 mass %, Mg: 0.30 mass % or more and 1.00 mass % or less, Zn: 0.60 mass % or less and 0.05 mass % or more, and B: 0.10 mass % or less and 0.005 mass % or more;

holding the aluminum alloy composition at a temperature of 450° C.-620° C. for at least 2 hours;

then, extruding the aluminum alloy composition to form a multi-hole pipe;

cooling the multi-hole pipe at an average cooling rate of 1° C./s or more until the temperature of the multi-hole pipe reaches 150° C.; and subsequently subjecting the cooled multi-hole pipe to an artificial-aging process by holding the multi-hole pipe at a temperature of 150-200° C. for 2 h or more such that the multi-hole pipe has a tensile strength of 290 MPa or more.

* * * * *